Patented Feb. 18, 1930

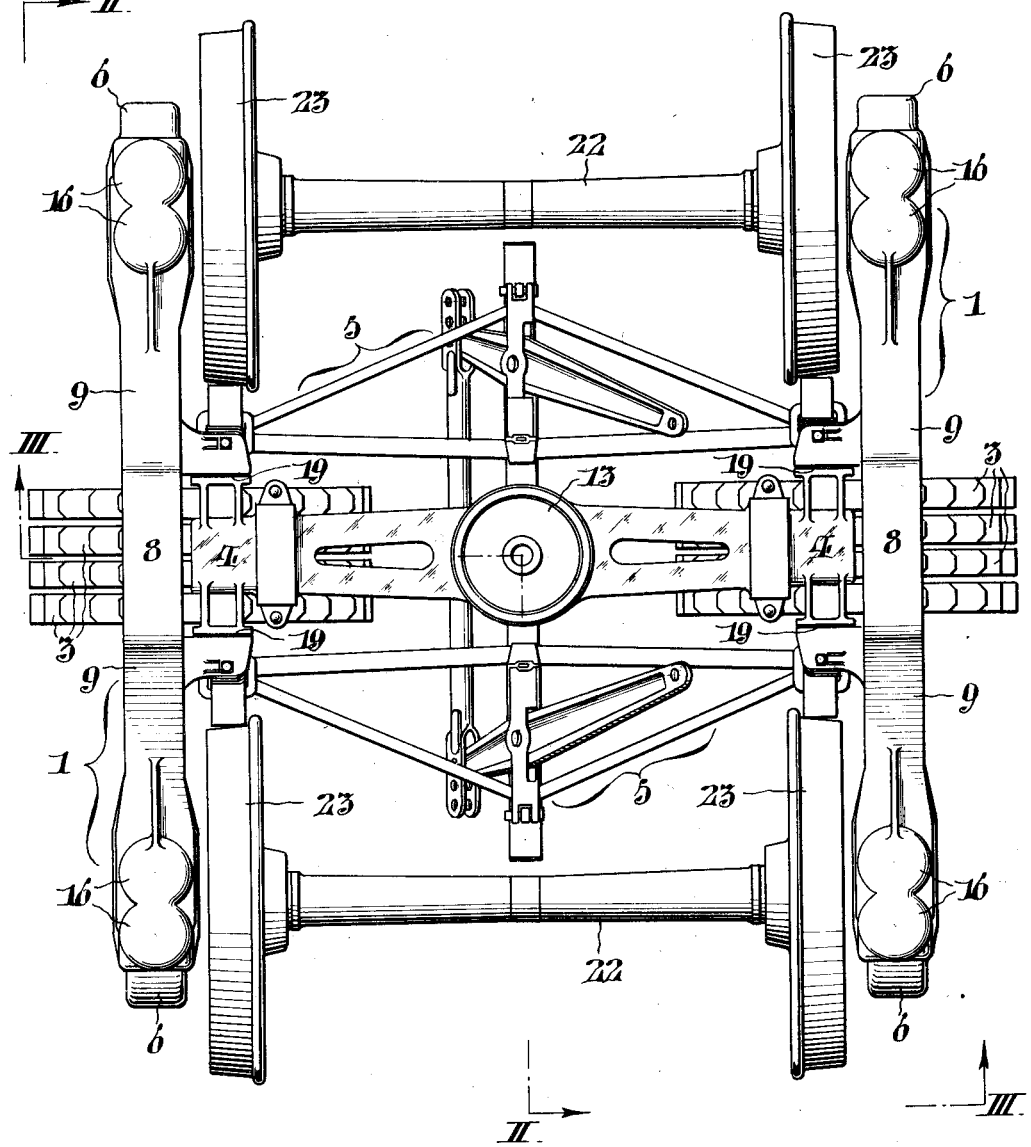

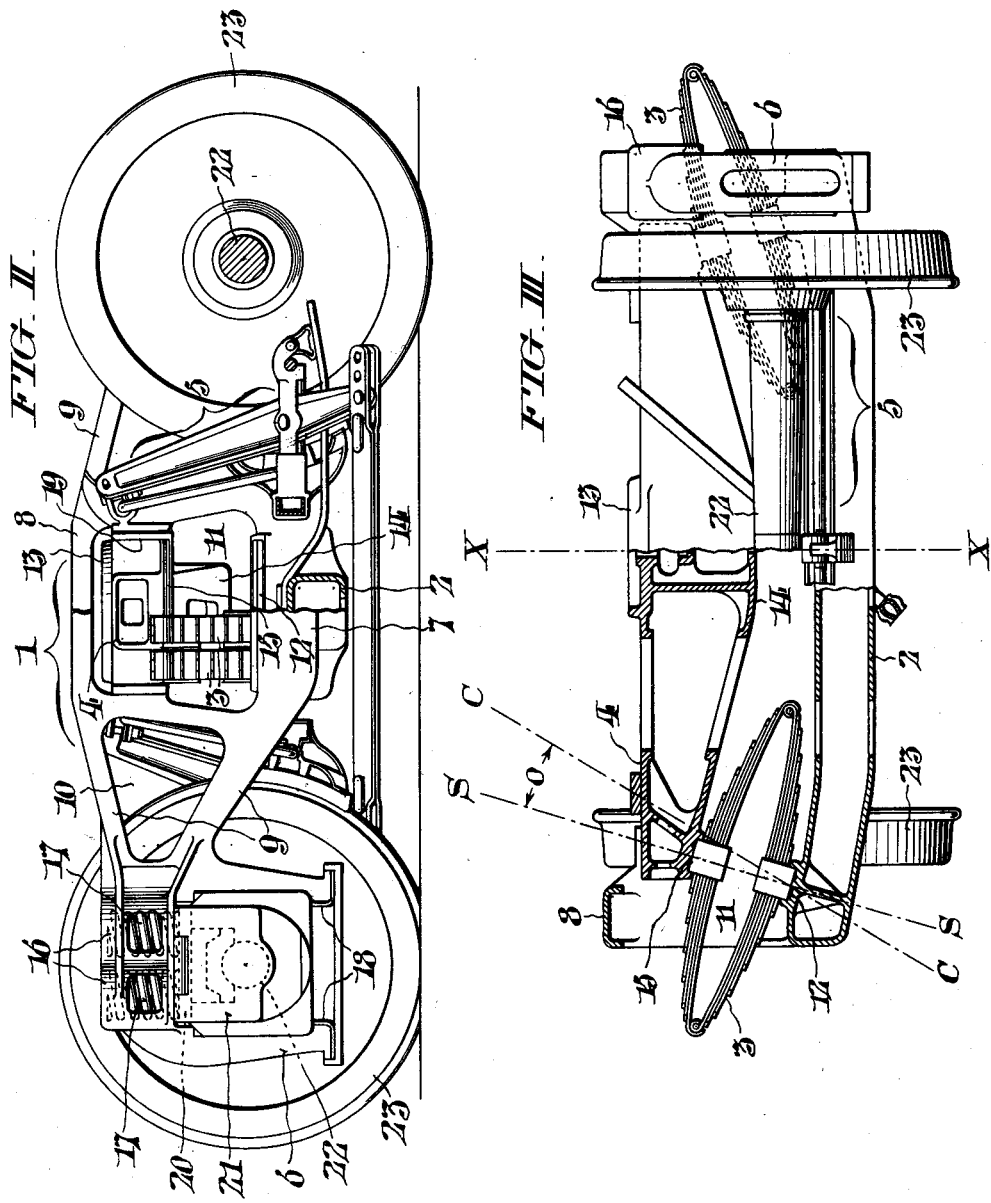

1,747,871

UNITED STATES PATENT OFFICE

WILLIAM F. KIESEL, JR., OF HOLLIDAYSBURG, PENNSYLVANIA

CAR TRUCK

Application filed July 29, 1929. Serial No. 381,962.

My invention relates to car trucks, and more particularly to trucks for passenger railway cars. Such cars are commonly equipped with swing motion trucks in which the bolster has the capacity of lateral as well as vertical movement, so as to ameliorate side shocks incident to swaying of the car body. Trucks of this type are provided with a bolster and spring plank suspended by hangers and gibs so that the car body can swing laterally with respect to the truck frame. The swinging motion is an advantage, especially on cars with a relatively low center of gravity.

An object of this invention is to provide a form of truck equivalent in its function of ameliorating side shocks to the swing motion trucks referred to, and further characterized by a smoother floating motion which does not disturb the comfort of the car passengers when the car body is subjected to more or less severe transverse impulses. My invention eliminates the use of a swinging spring plank with its customary adjuncts of hangers, gibs and pins. This is accomplished by inclining the bolster springs at a selected angle, the determination of which depends on the height of the center of gravity of the car body above the truck center plate.

A further object of the invention is to provide a truck frame comprising side members, cast integral with a transom located beneath the bolster, and adapted not only to accommodate the inclined springs, but also to prevent the truck from getting out of square.

For a better understanding of the invention, its advantages and specific objects attained with its use, reference should be had to the accompanying drawings and descriptive matter, in which I have illustrated and described a preferred embodiment of the invention.

Of the drawings:

Fig. I is a plan view of a four-wheel passenger car truck embodying the invention.

Fig. II is a side elevation of the same with a portion thereof shown in section taken along the lines II—II of Fig. I; and Fig. III is an end elevation of the same with a portion thereof shown in section taken along the lines III—III of Fig. I.

In the selected embodiment of the invention here shown, there is illustrated a passenger car truck comprising generally, pedestal type side frames 1 cast integral with a connecting transom 2, elliptic springs 3 accommodated in the windows 11 of the side frames, and a bolster 4 supported on the springs 3.

A conventional type of brake rigging, comprehensively designated by the numeral 5, is shown merely for the purpose of disclosing a substantially complete assemblage, the brake rigging forming no part of this invention.

The truss-type side members 1, which together with the transom 2, form an integral frame, consist of pedestal 6 connected with the central portion upon which the load is appled by tension members 7, compression members 8, and additional connecting members 9, all of substantially box-shaped section, and forming triangular openings 10 and a central window 11. The transom 2, likewise of box section, joins the side frames 1 at their tension members 7. As more clearly appears in Fig. III, the transom 2 is slightly inclined at its ends to accommodate the elliptic springs 3, and at the points where the transom joins the side frames 1 there are provided bearing faces 12 for the springs 3. The springs 3, which may be of elliptic, helical, ring, or other suitable type are placed with their axes S—S inclined toward the center line X—X of the car at an angle O depending upon the position of the center of gravity of the car body.

The bolster 4 which communicates the load of the car body through the springs 3 to the truck frame, comprises a rigid transverse member having the usual center plate 13 and is formed to provide maximum strength in proportion to weight. Its lower face 14 is inclined upward towards each end to accommodate the springs 3 and to form supporting faces 15 bearing upon the springs 3 at right angles to their axes. The bolster ends lie entirely within the side frames 1 and can be removed vertically without removing the springs 3 or otherwise disturbing any essential parts of the truck. It will also be apparent that by virtue of the construction described, the bolster is free to float vertically and transversely without any limitation as to the extent of its movement other than the capacity of the springs. The movement of the bolster is in no wise restricted by the side frames.

It will be observed that the transom 2 is situated directly beneath and in line with the bolster 4. The transom 2 thus connects the side frames at the tension members 7 which receive the major portion of the side thrust. Being an integral part of the side frames and of rigid construction, the transom 2 serves to prevent the truck from getting out of square.

The pedestals 6 are provided with spring pockets 16 housing vertical springs 17 of helical type which are interposed between the journal boxes 21 and the frame. Suitable liners 18 are fitted in the slides of the pedestals 6 where the journal boxes slide to provide wearing surfaces. Similar wearing liners 19 are also fitted in the central windows 11 of the side frames 1 where the sides of the bolster 4 are adapted to slide therein. The pedestal springs 17 rest upon a plate 20 interposed between the journal boxes 21 and the spring pockets 16. The journal boxes 21 may, of course, be of any variety, but I preferably employ an arrangement of boxes and pedestal springs such as described in U. S. Letters Patent No. 1,606,081, issued to me on November 9, 1926. The axles 22 and wheels 23 are of standard construction and need no description.

In the average passenger car the position of the center of gravity of the car body is approximately six feet above the top of the rail, and this position remains practically constant under different conditions of load; that is to say, the number and position of the passengers has very little effect upon the center of gravity. I have found that by inclining the bolster springs 3 so that the axis S—S of each spring forms a relatively acute angle—this angle being within the limits of five to twenty degrees depending upon the speed at which the car is intended to be operated—with a line C—C from the base of the spring through the center of gravity of the car body, the center of gravity, when the car is under impulses tending to move it transversely, will have a smooth floating motion of translation away from the center line of the track. The effect thus produced is somewhat similar to that accompanying the use of a spring plank suspended on hangers inclined about thirteen degrees from the vertical except that with a spring plank there is no frictional restraint so that the outward and return motions are distinctly noticeable and, more or less, disagreeable, whereas with the use of inclined bolster springs, such as elliptic springs, containing a friction element, the tendency to repeated transverse vibrations is materially dampened.

The truck of this invention is particularly adapted for use on passenger cars which, differing from freight cars, have a relatively constant center of gravity under different conditions of load, and the design of which involves as an important factor a consideration of the comfort of the passengers. This invention, therefore, aims not merely to provide a truck with capacity for lateral swaying movement, such capacity being obtainable to some extent with bolster springs set vertically or slightly inclined toward the center line of the car, but the truck is further characterized by a smooth floating motion not disagreeable to the comfort of the passengers, when the car body is subject to more or less severe transverse impulses. The floating capacity thus referred to varies in inverse proportion to the size of the angle O between the spring axis S—S and a line C—C through the center of gravity of the car body, which angle I have found should not be less than five degrees nor more than twenty degrees in order that the desired effect be produced.

While the invention has been described in some detail, it will be apparent to those skilled in the art that various modifications may be made in the form of the truck illustrated and described herein without departing from the spirit of the invention as defined in the appended claims.

Having thus described my invention, I claim:

1. A car truck comprising side frames, a connecting transom joining said side frames at their lower central portions, springs supported by said side frames and inclined toward the center line of the car, and a bolster on said springs, the ends of said bolster lying between said side frames.

2. A car truck comprising side frames, elliptic bolster springs supported in windows of said side frames and inclined toward the center line of the car, a bolster supported by said springs, the ends of said bolster lying between said side frames, and a transom connecting said side frames beneath said bolster, said bolster and transom being inclined to accommodate the springs aforesaid whereby their flexure is not obstructed.

3. A car truck comprising integral truss-type side frames and a transom, bolster springs supported by said side frames at the ends of said transom, said springs being inclined toward the center line of the car, and a bolster supported on said springs with its ends lying between said side frames whereby the bolster is free to float transversely and vertically on the truck frame.

4. A passenger car truck comprising integral side frames and transom, and bolster springs supported in windows of said side frames, each of said springs being inclined, for the purpose described, so that its axis forms a relatively acute angle with a line passing through the base of the spring and the center of gravity of the car body.

5. A passenger car truck comprising side frames, a connecting transom joining said side frames at their lower central portions, bolster springs supported by said side frames, a bolster on said springs with its ends lying between said side frames, each of said bolster springs being inclined, for the purpose described, so that its axis forms a relatively acute angle with a line passing through the base of the spring and the center of gravity of the car body.

6. A car truck comprising truss-type side frames having tension and compression members, a transom connecting said side frames at their tension members and cast integral therewith, springs supported in windows of said side frames, said springs being inclined toward the center line of the car, and a bolster on said springs overlying said transom.

In testimony whereof, I have hereunto signed my name at Altoona, Pennsylvania, this 26th day of July, 1929.

WILLIAM F. KIESEL, Jr.